United States Patent [19]
Labit, Jr.

[11] Patent Number: 5,560,091
[45] Date of Patent: Oct. 1, 1996

[54] APPARATUS FOR ALIGNING PIPE FLANGES

[76] Inventor: Sexon J. Labit, Jr., 5707 Sandoz Rd., New Iberia, La. 70560

[21] Appl. No.: 249,631

[22] Filed: May 26, 1994

[51] Int. Cl.⁶ .................................................. B25B 27/14
[52] U.S. Cl. ........................... 29/272; 29/271; 269/43
[58] Field of Search ........................ 269/37, 43, 45; 29/271, 272; 228/99.3

[56] References Cited

U.S. PATENT DOCUMENTS

| | | | |
|---|---|---|---|
| 2,480,399 | 8/1949 | Dolaser | 29/271 |
| 3,015,883 | 1/1962 | Brown | 29/271 |
| 4,150,477 | 4/1979 | Orr | 29/252 |
| 4,195,828 | 4/1980 | Peterson. | |
| 4,513,955 | 9/1985 | Daubon | 269/43 |
| 4,662,055 | 5/1987 | VanMeter. | |
| 5,074,536 | 12/1991 | McConkey. | |
| 5,094,435 | 3/1992 | Depperman. | |
| 5,228,181 | 7/1993 | Ingle. | |

FOREIGN PATENT DOCUMENTS

| | | | |
|---|---|---|---|
| 1046250 | 1/1979 | Canada | 29/271 |

*Primary Examiner*—Robert C. Watson
*Attorney, Agent, or Firm*—William W. Stagg

[57] ABSTRACT

An apparatus for aligning adjacent opposing first and second pipe flanges at the ends of opposing sections to facilitate attachment of the pipe flanges by bolting or other means, comprising an elongated body, an internally threaded ring mounted to the one end of the body, a plurality of studs having a smooth segment sized to correspond to common pipe flange bolt hole sizes and a threaded segment for selectively mounting a stud into the threaded ring and one of the bolt holes of the first pipe flange; a transverse section mounted to the other end of the body; and a jacking means for engaging the transverse section and the second pipe for moving the second pipe flange into alignment with the first pipe flange.

3 Claims, 2 Drawing Sheets

APPARATUS FOR ALIGNING PIPE FLANGES

FIELD OF INVENTION

The present invention generally relates to the fitting and assembly of piping systems and more particularly relates to an apparatus for aligning opposing adjacent pipe flanges to facilitate their connection by bolting or other means.

BACKGROUND OF INVENTION

In the assembly and fitting of piping systems it is often necessary to align opposing adjacent pipe flanges so that they can be connected by bolting or other means. The alignment of adjacent flanges may be difficult and time consuming depending upon the size of the pipe involved and the distance the opposing pipe flanges must be moved to achieve alignment.

Efforts have been made to provide tools to facilitate pipe flange alignment. One such device is that described in U.S. Pat. No. 4,662,055 to Van Meter. Van Meter describes a flange alignment tool and method for aligning flanges at opposite ends of a length of pipe. The tool is comprised of body portion having a flat surface for abutting the pipe flange rear surface, a curvilinear surface for engagement with the neck portion of the pipe flange and alignment pins which fit through adjacent bolt holes in the pipe flange. Resilient springs urge the alignment pins in a predetermined direction against the pipe flange bolt holes. Van Meter does not suggest a method for alignment of adjacent flanges of flanged pipe sections for attachment.

Another device is that described in U.S. Pat. No. 5,228,181 to Ingle. Ingle discloses a device for aligning opposing adjacent first and second pipe flanges. The device is comprised of an elongated body having jacking screws at each end, a carriage which can be positioned along the body, and a tie plate for attaching the carriage and to the first of the opposing pipe flanges by means of studs for insertion into the pre-existing pipe flange bolt holes.

Alignment is achieved with the Ingle device by positioning the carriage along the elongated body so that one of the jacking screws is at the second of the opposing flanges and the other is at a point on the pipe opposite the first opposing flange and turning the jacking screws to force the first and second pipe flanges into alignment. Ingle contains many parts which are positioned together and the user must maintain and keep track of many different tie-plates to use the device on different pipe with different pipe diameters, flange sizes and the like.

Still another device for of flange alignment has been described and illustrated in U.S. Pat. No. 5,074,536 to McConkey. The McConkey patent discloses a device to precisely align large diameter, flanged pipe sections comprised of an elongated central bolt having tapered mandrels at either end. Sleeve sections fit over the central bolt and mandrels which expand outward increasing the diameter of the device as the bolt is tightened.

In use the McConkey device is inserted into adjacent bolt openings of corresponding pipe flanges, the head of the bolt is turned expanding the diameter of the tool and forcing the bolt holes into a precise alignment so that standard fastening bolt assemblies may be used to secure the flanges together. A disadvantage of the McConkey device is that it is a precision alignment tool only and cannot be used unless the adjacent bolt holes are already substantially in alignment as the device must fit through the bolt holes of each flange.

A device used to clamp and align pipe tube sections for welding is disclosed in U.S. Pat. No. 4,195,828 to Peterson. The Peterson apparatus is comprised of a U-shaped bracket for caging the end of one of two adjacent tube sections and an opposing offset portion extending away from the caging bracket, the offset portion has a screwably adjustable shaft member for moving the other adjacent pipe tube into alignment with the caged tube end for welding.

Another method and apparatus for clamping and concentric alignment of a pipe flange to a pipe for permanent attachment by welding is illustrated in U.S. Pat. No. 5,094,435 to Depperman, et al. This clamping and alignment device is comprised of C-shaped frame having opposing end sections and a transverse section which is clamped to a bolt hole on the pipe flange and an elongated base portion which extends out over the pipe. The opposing end sections of the C-shaped frame are aligned with the bolt hole with alignment screws. The elongated base portion also has an alignment screw to engage the outer surface of the pipe to move the pipe for concentric alignment with the flange. Neither the Peterson device or the Depperman, et al device teach alignment of adjacent pipe flanges.

Consequently, a need exist for improvements in pipe flange alignment techniques and devices to align adjacent flanges of opposing pipe sections for attachment by bolting or other means.

SUMMARY OF INVENTION

The present invention provides an apparatus for aligning pipe flanges designed to satisfy the aforementioned needs. The alignment device is easily used and set up in the field. It is designed to fit directly onto the flanges of the pipes to be aligned without the use of straps, chains, bolts or other retainers by means of a smooth stud sized to fit securely into a flange bolt hole. The device readily accommodates pipe, flanges and bolt holes of varying dimensions by selecting an appropriately sized stud for use in connecting the device to the pipe flange. The stud may be selected to minimize the gap or "play" between the stud and the bolt hole wall to improve alignment. The threaded alignment shaft may be positioned to accommodate pipe or flanges of varying dimensions for alignment. Several of the devices may be used at one time for pipe flange alignment in different directions.

Accordingly, the present invention relates to an apparatus for aligning adjacent opposing pipe flanges comprising an elongated body having a threaded bore at one end for receiving a stud of a predetermined size for insertion into a bolt hole of one of the pipe flanges to be aligned and, at the other end, a transverse section with a screwably connected shaft for engaging the opposing flange to be aligned and by turning the shaft, positioning the flanges into alignment.

DESCRIPTION OF PREFERRED EMBODIMENT

Figure 1:
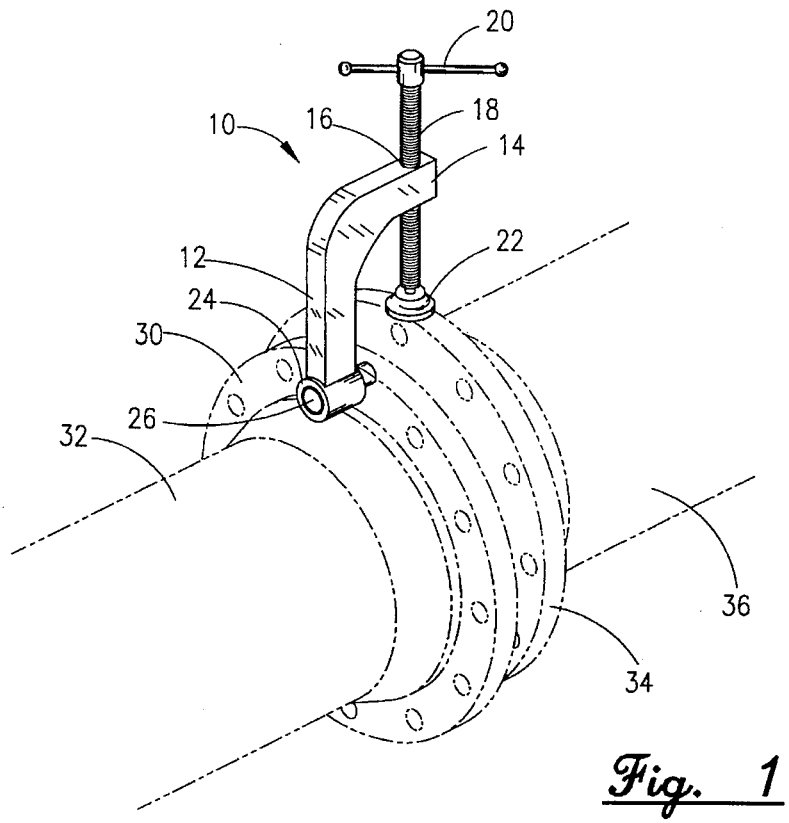
FIG. 1 is a perspective view of the pipe flange alignment device in accordance with the present invention showing the device in place between two adjacent pipe flanges prior to alignment.

Referring now to the drawings and more particularly to FIG. 1 there is shown in perspective view the preferred embodiment of the pipe flange alignment device, generally designated 10, in accordance with the present invention. The alignment device 10 is depicted in place between opposing adjacent pipe flanges 30 and 34 connected to corresponding pipe segments, 32 and 36, respectively. The size of the device 10 may be varied depending upon the size of the pipe upon which it will be utilized. It is anticipated that the device 10 will be manufactured in a variety of sizes to accommodate a range of pipe and pipe flange diameters.

The device 10 has an elongated body 12 and a transverse section 14. Connected to the body 12 at the end opposite the transverse section 14 is a ring 24 having a threaded bore 25 to which is mounted a stud 26 which protrudes from the bore 25.

The device 10 is attached to pipe flange 32 by inserting the stud 26 into one of the pipe flange bolt holes 38. In the preferred embodiment the diameter of the stud 26 and the bolt hole 38 are approximately the same to produce a secure fit of the stud 26 in the bolt hole 38.

The transverse section 14 of the device 10 has a threaded bore 16 for screwable engagement with a threaded shaft 18 having a swivel butt plate 22 and a turning handle 20. As the shaft 18 is turned by means of handle 20, the butt plate 22 is positioned against the opposing adjacent pipe flange 34. Further turning of the handle 20 moves the adjacent pipe flanges 30 and 34 into alignment for attachment by bolting or other means.

Figure 2:
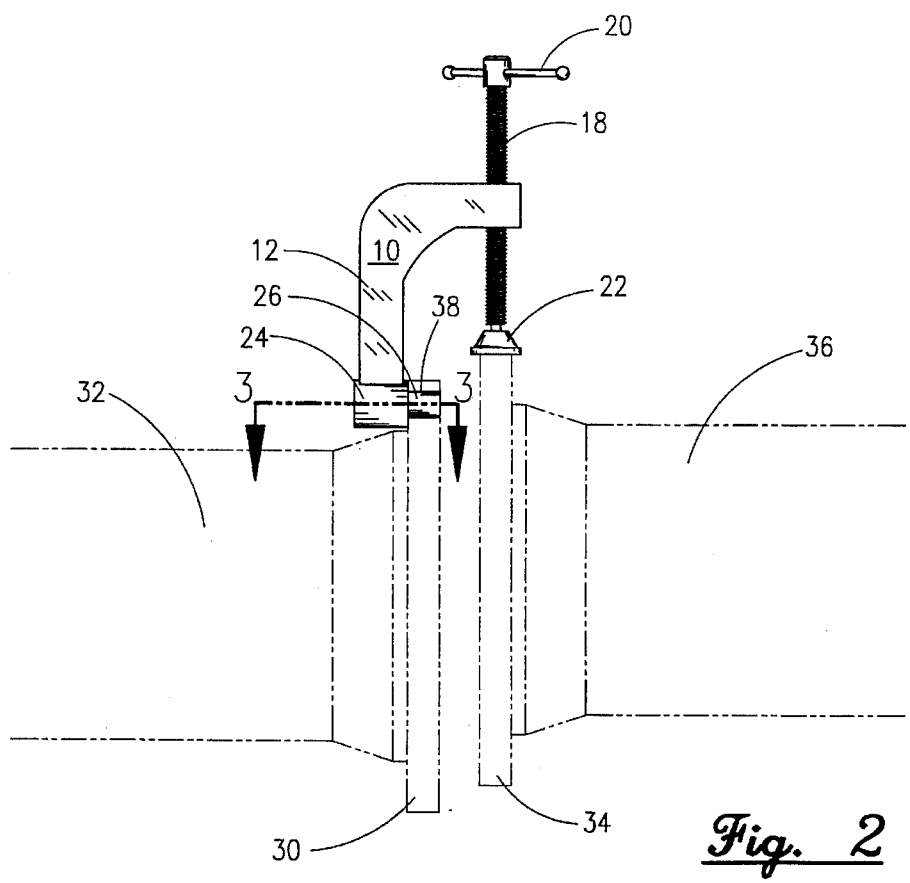
FIG. 2 is a side elevational view of the pipe flange alignment device in accordance with the present invention showing the device in place between two adjacent pipe flanges prior to alignment.

FIG. 2 is an elevational side view of the device 10 in place on adjacent opposing pipe flanges 30 and 34 prior to alignment. The stud 26, mounted to the ring 24 at the base of the body 12, is seated within the bolt hole 38 of pipe flange 30. The threaded shaft 18 which upon turning by means of the handle 20, moves through the threaded bore 16 to engage the adjacent pipe flange 34 at its butt plate 22. Further turning of the shaft 18 will move the opposing flanges 30 and 34 into alignment for bolting.

It is common in fitting pipe, that the opposing adjacent pipe flanges 30 and 34 may be out of alignment in more than one direction. In those situations, the user may employ several of the pipe flange alignment devices 10 at various positions around the pipe flanges to force the flanges 30 and 34 into an aligned position.

Figure 3:
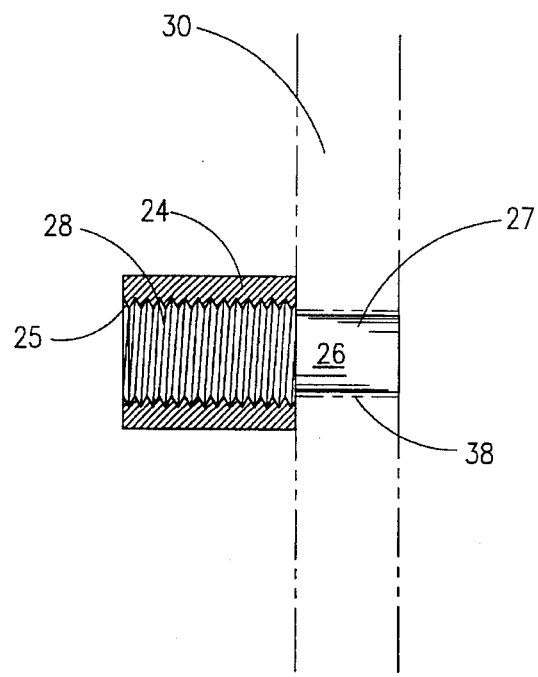
FIG. 3 is a partial cross-sectional view of the pipe flange with a connecting stud in place in a flange bolt hole.

FIG. 3, cut as shown in FIG. 2, is a partial cross-sectional view through the pipe flange 30 and the stud mounting ring 24 showing the stud 26 and bolt hole 38 connection. The stud 26 has a smooth segment 27 with a diameter approximately the same as the diameter of the bolt hole 38 and a threaded segment 28 cut to be screwably received within the bore 25 of the ring 24 at the base of the body 12. The diameter of the smooth segment may be varied depending upon the diameter of the bolt hole 38 of the flange 30 in which it is to be inserted.

Figure 4:
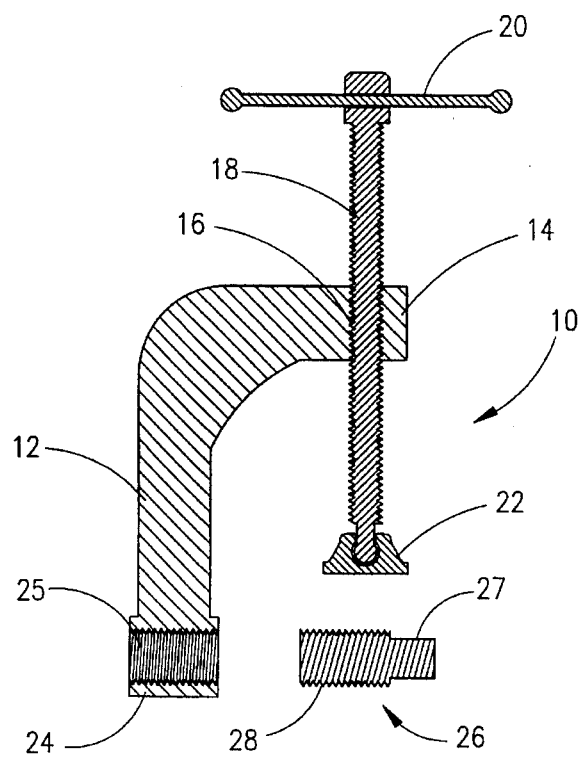
FIG. 4 is a cross-sectional view of the pipe flange alignment device.

FIG. 4 is an exploded cross-sectional view of the pipe flange alignment device 10. There is shown the elongated body 12 and the transverse section 14. At the base of the body 12 there is shown a ring 24 having a threaded bore 25 to receive the threaded segment 28 of the stud 26. The smooth 27 of the stud 26 has a diameter approximately equally to the bolt hole diameter of the flange to which it will be inserted.

In use the device 10 will be supplied with a variety of studs 26 each having a threaded segment 28 sized to be received into the bore 25 of the ring 24 but each having a smooth segments 27 corresponding to the common flange bolt hole sizes typically used on a given range of pipe flange sizes. This will allow the user of the device 10 to select a proper sized stud 26 to fit within a given bolt hole diameter. This ability to select the proper stud size will reduce the "play" between the stud 26 and the bolt hole 38 and facilitate the alignment of the adjacent flanges.

The transverse section 14 has a threaded bore 16 through which is screwably connected the threaded shaft 18. The shaft 18 is turned by the handle 20 and upon turning, the shaft 18 moves through the transverse section 14 until the swivel butt plate 22 of the shaft 18 engages the pipe flange to be aligned. Continued turning of the shaft 18 will move the pipe flange along the line of the shaft 18 and force the pipe into proper alignment.

In pipes of larger diameters, a substantial amount of effort may be needed to turn the shaft 18 for alignment of the pipe flanges. In those situations other types of jacking means between the pipe flange 38 and the transverse section 14 could be utilized. On such jacking means is a hydraulic jack positioned between the flange 34 and the transverse section 14.

Figure 5:
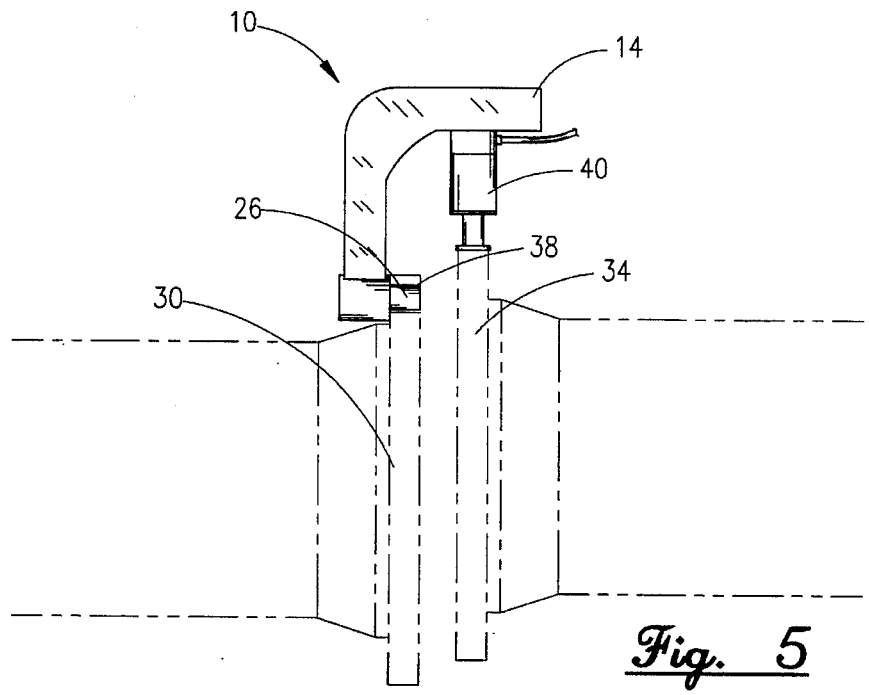
FIG. 5 is a side elevational view of an alternate embodiment of the pipe flange alignment device in accordance with the present invention having a hydraulic jack in place of a threaded shaft.

FIG. 5 is an alternative embodiment of the pipe flange alignment device 10 with a hydraulic jack 40 positioned between the transverse section 14 and the pipe flange 34. The device 10 is secured to the adjacent opposing flange 30 by means of a stud 26 inserted in a bolt hole 38 in the manner described above. In use, fluid pressure is applied to the jack 40 to force the opposing flanges 30 and 34 into alignment.

It is thought that the pipe flange alignment device and method of the present invention and many of its attendant advantages will be understood from the foregoing description and it will be apparent that various changes may be make in the form, construction and arrangement of the parts thereof without departing from the spirit and scope of the invention or sacrificing all of its material advantages, the form described herein being merely a preferred or exemplary embodiment of the invention.

I claim:

1. An apparatus for aligning adjacent first and second pipe flanges at the ends of opposing first and second pipe sections, said pipe flanges having holes for attachment of the pipe flanges by bolting or other means, comprising:

a) an elongated body, said body having a proximal end and a distal end;

b) an internally threaded ring mounted to the proximal end of said body;

c) a plurality of studs, each of said studs having a smooth segment sized to correspond to a plurality of common pipe flange bolt hole sizes for selective insertion of said smooth segment of said stud into one of said bolt holes of said first pipe flange and a threaded segment for selective screwable connection of said threaded segment of said stud with said internally threaded ring;

d) a transverse section mounted to the distal end of said body, said transverse section having a threaded bore;

e) a threaded shaft screwably connected with said threaded bore of said transverse section for movement of said shaft toward and away from said second pipe flange so as to engage said shaft with said second pipe flange for alignment of said second pipe flange with said first pipe flange; and f) means for turning said threaded shaft.

2. An apparatus for aligning adjacent first and second pipe flanges at the ends of opposing first and second pipe sections, said pipe flanges having holes for attachment of the pipe flanges by bolting or other means, comprising:

a) an elongated body, said body having a proximal end and a distal end;

b) an internally threaded ring mounted to the proximal end of said body;

c) a plurality of studs, each of said studs having a smooth segment sized to correspond to a plurality of common pipe flange bolt hole sizes for selective insertion of said smooth segment of said stud into one of said bolt holes of said first pipe flange and a threaded segment for selective screwable connection of said threaded segment of said stud with said internally threaded ring;

d) a transverse section mounted to the distal end of said body; and e) a jacking means for engaging said transverse section and said second pipe and moving said second pipe flange in alignment with said first pipe flange section.

3. A pipe flange alignment apparatus as recited in claim 2 wherein said jacking means includes a hydraulic jack.

* * * * *